(12) United States Patent
Navarro (10) Patent No.: US 6,591,868 B1
(45) Date of Patent: Jul. 15, 2003

(54) HYGIENIC EVACUATION VALVE

(76) Inventor: Ramon Munoz Navarro, 4829 E. Walnut Ave., Orange, CA (US) 92856

( * ) Notice: Subject to any disclaimer, the term of this patent is extended or adjusted under 35 U.S.C. 154(b) by 132 days.

(21) Appl. No.: 09/642,890

(22) Filed: Aug. 22, 2000

Related U.S. Application Data (60) Provisional application No. 60/162,134, filed on Oct. 29, 1999.

(51) Int. Cl.[7] ............................................. F16K 11/20
(52) U.S. Cl. ................................................ 137/596.18
(58) Field of Search ..................................... 137/596.18

(56) References Cited

U.S. PATENT DOCUMENTS

| | | | |
|---|---|---|---|
| 1,452,811 A | * | 4/1923 | Mueller ....................... 251/357 |
| 4,221,101 A | | 9/1980 | Woods |
| 4,478,241 A | * | 10/1984 | Cardenas-Franco et al. ..... 137/596.17 |
| 4,657,048 A | * | 4/1987 | Foster .................... 137/596.18 |
| 5,479,978 A | | 1/1996 | Zenkich |
| 5,549,134 A | * | 8/1996 | Browne et al. ............. 137/883 |
| 5,564,457 A | | 10/1996 | Beck |

* cited by examiner

*Primary Examiner*—Gerald A. Michalsky
(74) *Attorney, Agent, or Firm*—William D. Breneman; Peter J. Georges (57) ABSTRACT

The invention pertains to a hygienic vacuum valve for use in sterile environments such as food processing, medical and pharmaceutical applications where a vacuum valve is advantageously utilized in situ on processing equipment to eliminate multiple vacuum lines and valves remotely located from the processing equipment. The novel evacuation valve and method for evacuating, providing a sterilized environment and then sealing the package is accomplished by utilizing a vacuum valve having a housing which accommodates a first piston for opening and closing a vacuum inlet ported to a vacuum outlet and a second piston disposed between the housing and the vacuum outlet for rapidly releasing the vacuum after the package has been sealed. The first and second pistons each preferably include a sealing head which seats in a tapered frusto-conical shaped seat for positively sealing the vacuum inlet and the vent port in the operation of the valve.

49 Claims, 11 Drawing Sheets

FIG. 17

HYGIENIC EVACUATION VALVE

CROSS REFERENCE TO RELATED APPLICATION

This application benefits from the filing date of an earlier filed provisional application Ser. No. 60/162,134 filed Oct. 29, 1999.

BACKGROUND OF THE INVENTION

1. Field of the Invention

The invention pertains to a hygienic evacuation valve, typically employed in food industry, pharmaceutical or medical processing equipment. The novel hygienic evacuation valve includes a first piston cylinder combination for positively opening and closing a vacuum source which is ported in the housing to an evacuation port in combination with a second piston cylinder combination for rapidly releasing the vacuum after the packaging machine has sealed the product. Optionally, a special gassing or sterilization port may be providing along with a positive pressure release to assist in the release of the sealed package. The optional special gassing or the provision for a sterilized environment for the packaged product can be provided by a gassing port associated with the housing of the novel hygienic evacuation valve.

The novel hygienic evacuation valve includes a housing with a first piston having a sealing head for sealing a vacuum fitting having a tapered seat for receiving the sealing head of the first piston and a second piston, the second piston also having a sealing head for seating in a tapered seat in the novel evacuation valve in which the first piston and second piston are pneumatically controlled to operate sequentially to first close the vent port and then open the vacuum inlet to the vacuum outlet of the housing to provide evacuation of a product on a product processing machine and then, once evacuated, close the first piston and open the second piston to rapidly release the vacuum in the valve and the line to the product processing machine after sealing of the product. The rapid release of vacuum from the valve and the line to the packaged product as well as the option to provide positive pressure after closing the vacuum line assists in removing the sealed product from the product processing machine.

The novel evacuation valve further includes ports for providing special gas environments or the sterilization of packaged products by the introduction of specialized gasses into the product to be packaged to provide either a sterilized or a special gas environment for the packaged product. After providing a special gas environment or sterilization the vent port valve piston is closed and the evacuation piston is opened to remove some, if not all, the special gas from the inside of the package prior to sealing and then reopening the vent port valve piston to rapidly remove vacuum pressure to assist in the separation of the sealed and packaged product. In the preferred application of the novel evacuation valve, the wall or walls of the packaged product are collapsed around the package as is common in the vacuum packaging of cheese and dairy products in sealed thin film plastic packages.

Optionally, the novel evacuation valve may be adapted and operated to first evacuate a product to be packaged by first closing the vent port valve, then opening the evacuation piston to evacuate the package and then opening the special sterilization or gassing port to admit a special sterilization or processing gas to the package before sealing the package. Once the package is sealed the vent port is opened to release the vacuum in the line to the packaged product. In such applications, the packaged product is generally placed in sealed containers Which have one or more non-deformable walls such as are utilized in the packaging of cheese, meats and the packaging of some medical devices.

The novel evacuation valve includes flanges for connecting the vacuum inlet fitting to the housing, as well as a flange for connecting the vacuum outlet to the product processing machine and a further flange for connecting the first cylinder housing to the evacuation valve. An optional fourth flange can be provided for connecting the vent valve or gassing ports to the novel hygienic evacuation valve housing. The purpose of utilizing flanges in the preferred application of the invention is to provide a seamless, non-threaded, smooth stainless steel valve for processing packaged products requiring a clean, hygienic, sterile or sanitary environment.

The novel method of the invention provides for the hygienic and sanitary packaging of products requiring a partially or substantially completely evacuated package or a package containing a specialized gassed, sterilized or treated ambient environment prior to the sealing of the packaged product. The method provides for the treatment of the product in the package by the introduction of various sterilizing fluids or specialized gasses into the product before the sealing of the product package before the sealing of the package and subsequent release of the vacuum to the packaged product and release of the packaged and sealed product from the processing machine.

The advantages of the novel evacuation valve and method include the ability to place the novel hygienic evacuation valve in situ on the package processing machine as a result of the compact size of the novel evacuation valve. The novel evacuation valve further allows a single port to the packaged product to accomplish a multiplicity of functions including gassing, evacuating and venting in a single line as opposed to the requirement in the prior art of multiple lines to the packaged product. Further the novel evacuation valve positively opens and closes the vacuum and positively controls ventilation by the utilization of the first and second pistons and eliminates the necessity of remotely mounting the valve with respect to the processing machine and requiring the inefficient application of vacuum to the packaging machine by requiring vacuum hoses and a multiplicity of other hoses to run from the remotely located vacuum valve to the packaging machine.

2. Description of Related Art, Including Information Disclosed Under 37 C,F.R, 1.97 and 1.98

The prior art includes various types of vacuum valves employed in a variety of different machines and packaging applications. A few of the vacuum valves include various types of ports and systems for relieving vacuum pressure once the vacuum has been removed from the source. Some of these valves include threads and various types of vacuum fittings, which are generally not compatible with applications involving medical, pharmaceutical and food processing applications, which require an evacuation valve without seams or threads in which food or processed products can collect to contaminate the contents of the sanitary packaged material. Hygienic evacuation valves typically used in the food processing art, are commonly remotely located from the food processing machine as a result of their size and the complexity of their components. Typically, such remotely located valves require the connection of long vacuum hoses from the remotely located valve to the packaging machine, which reduces the efficiency of the evacuation process.

Further, such vacuum valves, due to their size and complexity, require an amount of space that is incompatible with locating the valve on the product processing and packaging machines. Typical prior art vacuum valves used in the food processing and pharmaceutical processing industries for hygienically packaging food products includes the Tiament valve manufactured by the Tiament Company at Im Rutter in D-35216 Biedenkopf Wallau, Germany. This valve is typically remotely located in a housing separate from the packaging machine and typically takes up a space of about 12 inches by 6 inches and includes hoses that connect the valve to the hygienic packaging machine.

Unlike available evacuation valves used in the food processing industry, the present valve is of a compact design, employs a positive control over both the vacuum inlet piston and vacuum vent piston and can be disposed directly on the hygienic packaging machinery. Further, unlike the available prior art the novel evacuation valve is designed to utilize a single port to not only evacuate but also to gas-purge and release pressure in the line, valve housing and port. In addition as a result of its compact size the novel valve allows the more efficient utilization of vacuum along with the more positive control over the vacuum, utilizing pistons having a cylindrical sealing head, in combination with a frustroconical or tapered valve seat to positively control the opening and closing of the vacuum, as well as the opening and closing of the venting ports.

Other prior art uncovered in a patent search, includes Woods U.S. Pat. No. 4,221,101, which illustrates generally the type of packaging machines and processes utilized for sealing a food product such as cheese and bacon. As illustrated in FIG. 7, a pair of tubes are employed to provide for gassing and evacuation from a remotely located evacuation valve. The invention, unlike the prior art, allows the novel evacuation valve to be disposed in situ on the packaging machine as a result of its compact size and utilizes a single tube to provide evacuation, gassing and the release of pressure in the tube and valve housing.

Prior art valves uncovered in the search also include "two-in-one" pressure and vacuum relief vent devices as represented by Zenkich U.S. Pat. No. 5,479,978. These prior art valves, like the novel evacuation valve of the invention, utilize a single port in the container wall to supply vacuum and pressure release. Unlike the present invention, such prior art does not provide positive control over both vacuum and pressure relief, provide three in one capabilities and are not designed for medical pharmaceutical and food processing applications.

Beck U.S. Pat. No. 5,564,457 provides a vacuum breaker valve configured for clean in place applications in the food and dairy processing industry. The vacuum breaker valve of Beck U.S. Pat. No. 5,564,457 is, however, not used for vacuum packaging, but instead provides for the entry of air into the valve body upon the depressurization of fluid to prevent a siphoning effect upon a fluid (liquid) in the passageway or conduit. The only features shared by Beck U.S. Pat. No. 5,564,457 and the invention are the ease of cleaning the valve and the valve's application to the food processing industry.

SUMMARY OF THE INVENTION

The invention pertains to a novel evacuation valve for use in pharmaceutical, medical and food processing applications having a single outlet port for gassing, evacuation and pressure release utilizing positive control over a first piston or vacuum, piston for opening and closing a vacuum port to a packaged product and positive control over a second piston or vent piston after the packaging or sealing of the package to rapidly release the vacuum to assist in the rapid release of an evacuated and sealed package from the packaging machine.

The novel compact evacuation valve eliminates problems of prior art packaging valves by providing a seamless, non-threaded valve assembly preferably made of stainless steel or other materials and alloys suitable for the sterile and hygienic handling of food, medical and pharmaceutical materials. The novel evacuation valve assembly includes a main valve body or housing, a piston activating chamber and a vacuum inlet assembly which are connected together with flange clamps. The utilization of flange clamps assists in the cleaning and maintenance of the valve in a sanitary and hygienic condition and allows for easy removal, cleaning and sterilization of the components.

As a consequence of its compact design, the novel valve not only can be attached in situ or directly on the packaging and filling machines, but also, the novel evacuation valve utilizes vacuum more efficiently allowing orifice sizes to be reduced as much as ⅓ the size of orifices on comparable vacuum valves. The compact nature of the design, as well as its positive control over vacuum and venting and optional specialized gassing or sterilization processing of packages allows the novel evacuation valve to be utilized in accordance with the method of the invention, which provides for attaching the novel valve directly to the product packaging machine, instead of requiring remote location of the novel evacuation valve, as has heretofore been utilized in the prior art.

The novel evacuation valve includes a main housing for accommodating a first piston having a sealing head for positively opening and closing a vacuum inlet connected to a vacuum outlet port in the housing. A second piston, disposed intermediate the vacuum outlet and a vent valve, operates to open and close the vent to the vacuum outlet. The operation of the first piston and the second piston to open and close the vacuum and vent ports are controlled by a solenoid. In operation, when the first piston is closed, the second piston opens the vent to the vacuum outlet and when the first piston is open the second piston closes the vent. The first and second pistons, preferably include a sealing head designed to seat in a tapered opening to provide positive control over vacuum and venting operations.

The first and second pistons are preferably pneumatically operated, which, together with the shape of the piston sealing head, in combination with the tapered seats, provide a rapid and positive control over the vacuum and venting operations. The positive control over vacuum, venting and gassing is provided by utilizing a piston with a tapered seat. This arrangement is further augmented by disposing the tapered seat intermediate the piston sealing head and the housing with the tapered seat tapering toward the area of greatest vacuum or least pressure.

An optional product gassing or sterilization processing port is provided in the valve housing to gas or provide for the sterilization of the product in the package before it is sealed. The optional gassing or sterilization port can also be opened and closed with a pneumatically controlled piston. Typically in food and pharmaceutical industries, a gas is introduced into the product package before the product is evacuated and sealed. The novel processing port can introduce nitrogen as is typically used in the food processing industry, or an inert gas or other processing or sterilization gas into the packaged product. Once gassing is complete the vent port is closed, the evacuation port opened by the activation of the vacuum piston to remove excess nitrogen, inert gas, or other processing gas introduced into the packaged product. Upon completion of evacuation, the first piston or vacuum piston is closed and the venting piston or second piston is opened. Optionally, the venting piston can be connected either to the ambient environment or to a positive pressure source to provide a positive pressure for assisting in the release of the sealed packaged product.

The novel evacuation valve of the invention, as a result of its compact size and configuration, is easily cleaned on the machine, easily disassembled for maintenance or sterillzation for use in various pharmaceutical, medical and food and dairy products applications.

BRIEF DESCRIPTION OF THE DRAWINGS

The advantages of the invention will become more apparent to those skilled in the art in conjunction with the detailed description of the invention in which.

DETAILED DESCRIPTION OF THE INVENTION

Evacuation valves constructed in accordance with the preferred embodiment of the invention, employ a housing having a single outlet line to a packaging machine along with a first piston, preferably pneumatically operated to open and close a vacuum inlet and a second piston to open and close a vent valve, wherein the first piston and second piston are designed to operate so that when the first piston is closed the second piston is opened to provide venting through the single outlet line and when the first piston is open, the vent piston is closed to provide evacuation through the single outlet line of the housing. An optional gassing port and an optional gassing piston and seat can also be provided.

Preferably, the first and second pistons are disposed substantially perpendicular to one another in the housing and connected to the single outlet line and the optional product gassing or sterilization port is provided for providing a modified atmosphere packaging or medium for the packaged product before the packaged product is partially or completely evacuated and the vacuum in the housing and line to the packaged product is either rapidly removed or a positive pressure is provided to assist in the removal of the packaged product from the packaging and sealing machine. Typically, such evacuation valves demand the valve be easily cleaned, provide a positive control over vacuum and the rapid release of the vacuum after the sealing of the package. Such evacuation valves have no perceptible leakage and operate at a vacuum of about 29.4 inches of mercury to about 1 Torr as well as providing positive control over the vacuum and the release of vacuum in the valve housing.

Figure 16:
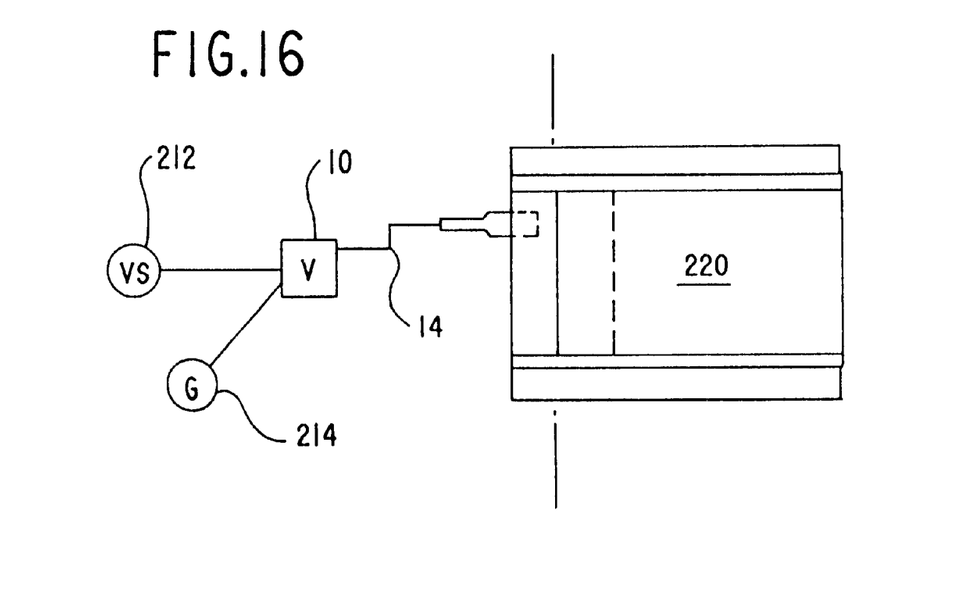
FIG. 16 is a schematic view of a package and evacuation system of the invention.

Referring now to FIGS. 1, 1A, 1B and 1C, a novel evacuation valve 10 is illustrated in accordance with the best mode of the invention. The evacuation valve 10 includes a housing 12 and a combination gassing, venting and evacuation port 14 (FIG. 1A), which provides vacuum to the packaging machine chamber for the package (FIG. 17) and which is designed for easy connection directly to an evacuation nozzle of a packaging machine (FIGS. 16 and 17) through a flange clamp 16, which connects flange 18 of housing 12 to a matching flange on the line to the evacuation nozzle of the packaging machine.

An O-ring 20 is provided for sealing flange 18 to a corresponding evacuation flange on the packaging machine to provide a vacuum tight seal. Flange clamp 16 is preferably a tri clover flange clamp and is available from various venders including Tri-Clover of Kenosha, Wis. and Top Line Process Equipment Corp. Of Bradford, Pa. Flange clamp 16 preferably is made in two halves pivotably attached to each other and secured through a threaded bolt 22 for adjustably securing flange clamp 16 to flange 18 of housing 12 to provide a vacuum-tight seal.

Referring now to FIGS. 1, 1A, 2 and 3, housing 12 includes a vent collar 24 (FIG. 1A) which provides venting to the packaging machine chamber (FIG. 17) and which includes a plurality of vent openings 26 to allow a rapid release of vacuum from housing 12 to assist in the release of an evacuated packaged product. It will be recognized that vent openings 26 may be vented to the atmosphere or positive pressure ports may be provided to positively provide positive pressure to assist in the rapid removal of vacuum in housing 12 and the line to the evacuation nozzle of the packaging machine.

Vent collar 24 includes a plurality of threaded openings 28 for receiving a plurality of bolts 30 for securing a cylinder end plate 32 and spacer 34 through which vent piston 36 is operated in spacer 34 and vent collar 24 which forms a chamber 38 (FIG. 2) in which vent piston 36 operates. Chamber 38 terminates in an inwardly tapering sealing seat 40 which receives the sealing head 42 of piston 36. Vent piston 36 is designed to mate with the inwardly tapering sealing seat 40 to form an airtight seal by utilizing a cylindrical sealing head 42 which is composed of rubber or an elastomeric material that is attached to vent piston 36 by screw 44 through washers 46 and 48.

Cylinder end plate 32 includes a bushing 50 and an O-ring seat for seating O-ring 52, which is closed by washer 54 and nut 56. Bolt 58 provides for adjustment for the travel of piston 36 in chamber 38 and provides for the adjustment for the seating and sealing of cylindrical sealing head 42 in inwardly tapering sealing seat 40. A first pneumatic fitting 60 introduces air pressure into the top of a piston activation chamber to advance vent piston 36 to close the vent by forcing the cylindrical sealing head 42 into the inwardly tapering sealing seat 40. A second pneumatic fitting 62 is provided to introduce air pressure into the bottom of the piston activating chamber to rapidly retract vent piston 36 from the inwardly tapering sealing seat 40 and allow the venting of vacuum from the interior of housing 12 and evacuation port 14 through vent openings 26. The advancement and retraction of vent piston 36 and the piston activation chamber is similar to the advancement and retraction of the vacuum valve piston as will be described hereinafter in greater detail in reference to FIG. 1B.

Figure 1:
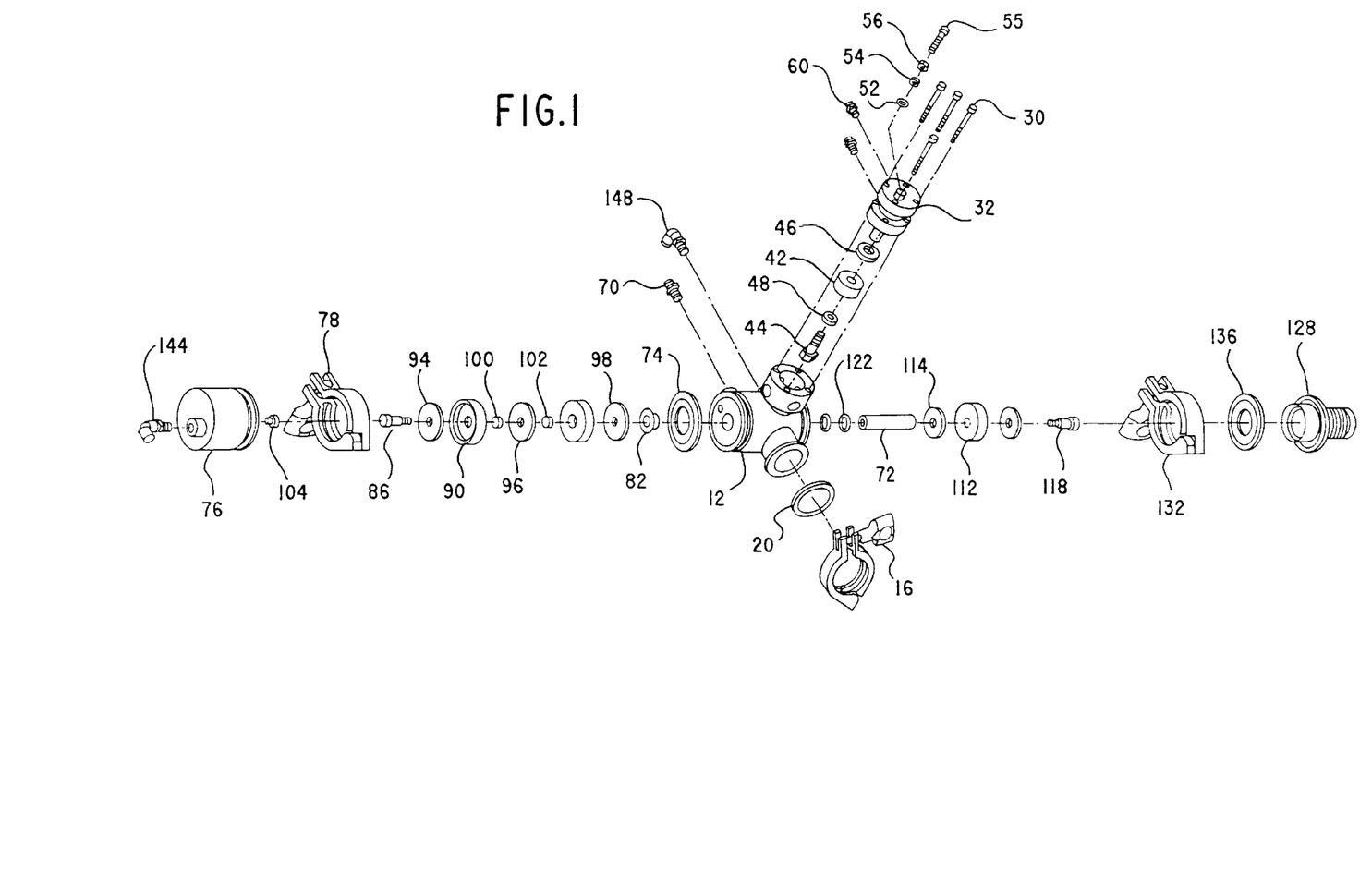
FIG. 1, FIGS. 1A, 1B and 1C are exploded views of the novel evacuation valve with FIGS. 1A, 1B and 1C enlarged views of FIG. 1.
Figure 1A:
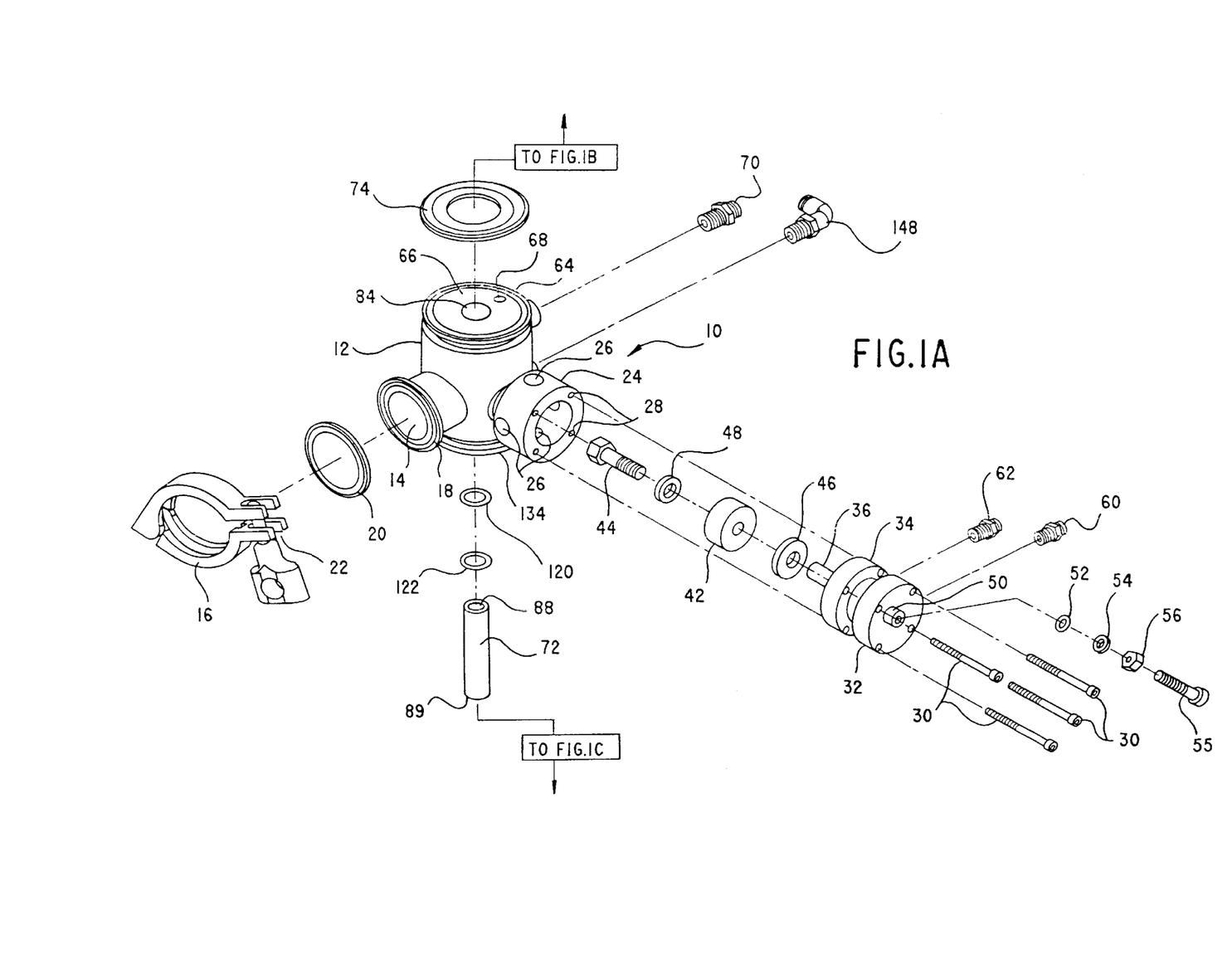
Figure 1B:
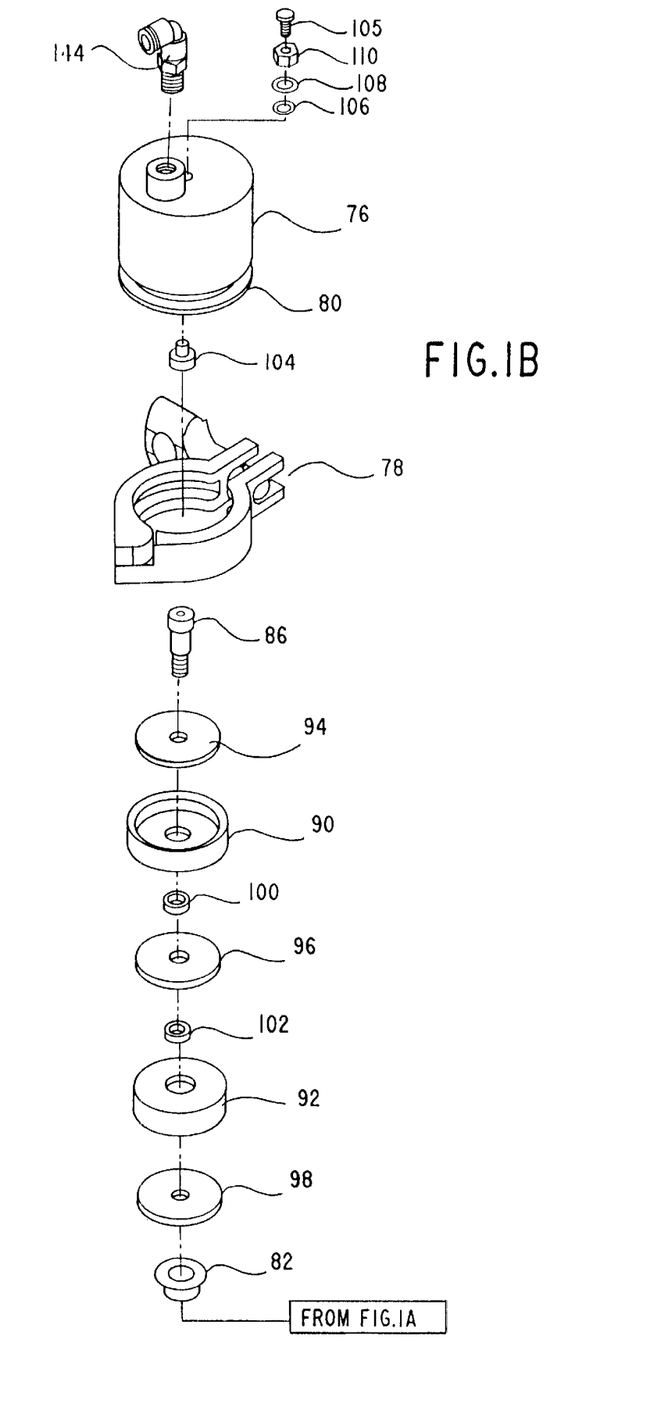

Referring now to FIGS. 1 and 1B, housing 12 includes a cylinder housing flange 64, with a tapered support plate 66, which includes a pneumatic port 68, connected to pneumatic fitting 70 for activating vacuum valve piston 72. A sealing gasket 74 is utilized for providing for the sealing of the cylinder housing 76 to housing flange 64 with flange clamp 78 that engages cylindrical housing flange 64 on housing 12 to flange 80 on cylinder housing 76. A bushing 82 is utilized in opening 84 in plate 66 for guiding vacuum valve piston 72 in housing 12. A bolt 86 is threadably received in opening 88 of vacuum valve piston 72 and provides support for upper cylinder cup 90 and lower cylinder cup 92, which are secured to vacuum valve piston 72 through washers 94, 96 and 98 and bushings 100 and 102. A threaded bushing 104 is disposed through cylinder housing 76 to provide adjustment for vacuum piston 72 in housing 12 in a manner similar to that described with respect to vent piston 36. Threaded bushing 104 is connected to adjustment bolt 105 through O-ring 106, washer 108 and locking nut 110, in a manner similar to adjustment bolt 55 for vent piston 36.

Figure 4:
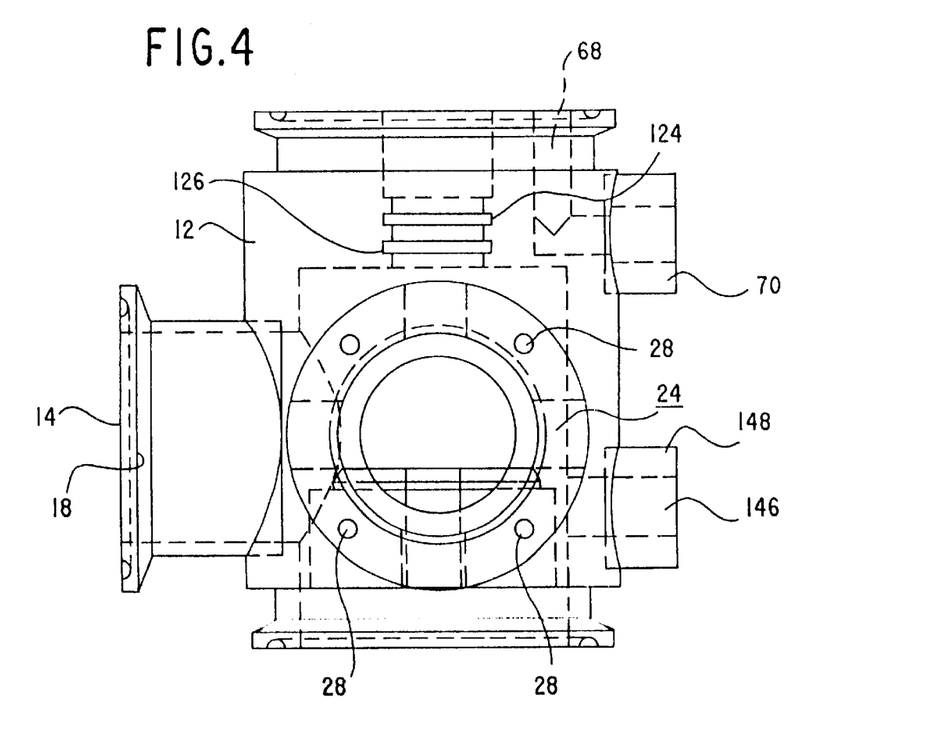
FIG. 4 is a right side elevational view of the novel evacuation valve housing of FIG. 2.
Figure 5:
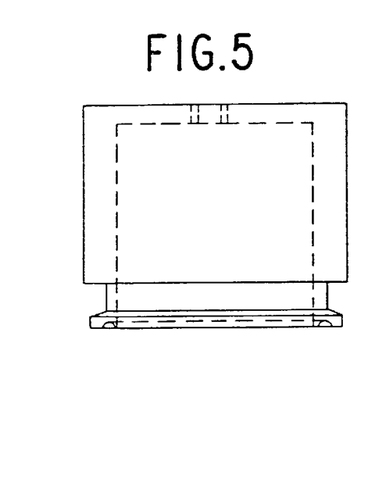
FIG. 5 is a side elevational view illustrating the cylinder housing of the novel evacuation valve of FIG. 1.
Figure 6:
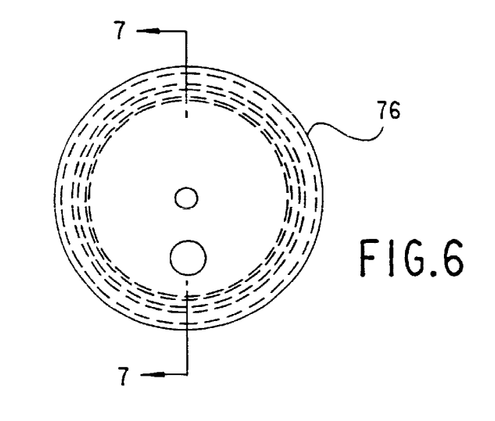
FIG. 6 is a bottom plan view of the cylinder housing of FIG. 5.
Figure 7:
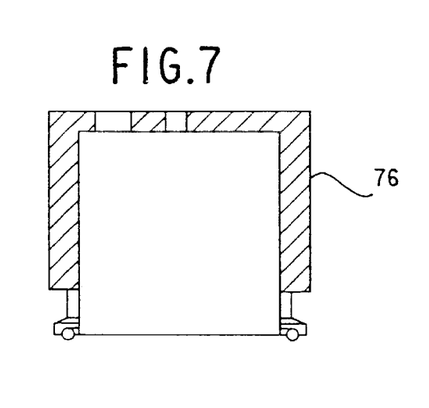
FIG. 7 is a cross-sectional view of FIG. 6, taken along the lines 7—7 of FIG. 6.

Referring now to FIGS. 1, 1A, 1C and 4, the other end of vacuum valve piston 72 is connected to cylindrical sealing head 112, through washers 114 and 116 and through bolt 118, which is threadably engaged into a threaded opening 89 in vacuum valve piston 72. O-rings 120 and 122 are provided for sealably engaging the sides of vacuum valve piston 72 and are captured in O-ring recesses 124 and 126, respectively in housing 12 (FIG. 4). A vacuum fitting 128, having a flange 130, is secured to housing 12 by flange clamp 132 which simultaneously engages flange 134 on housing 12.

Figure 1C:
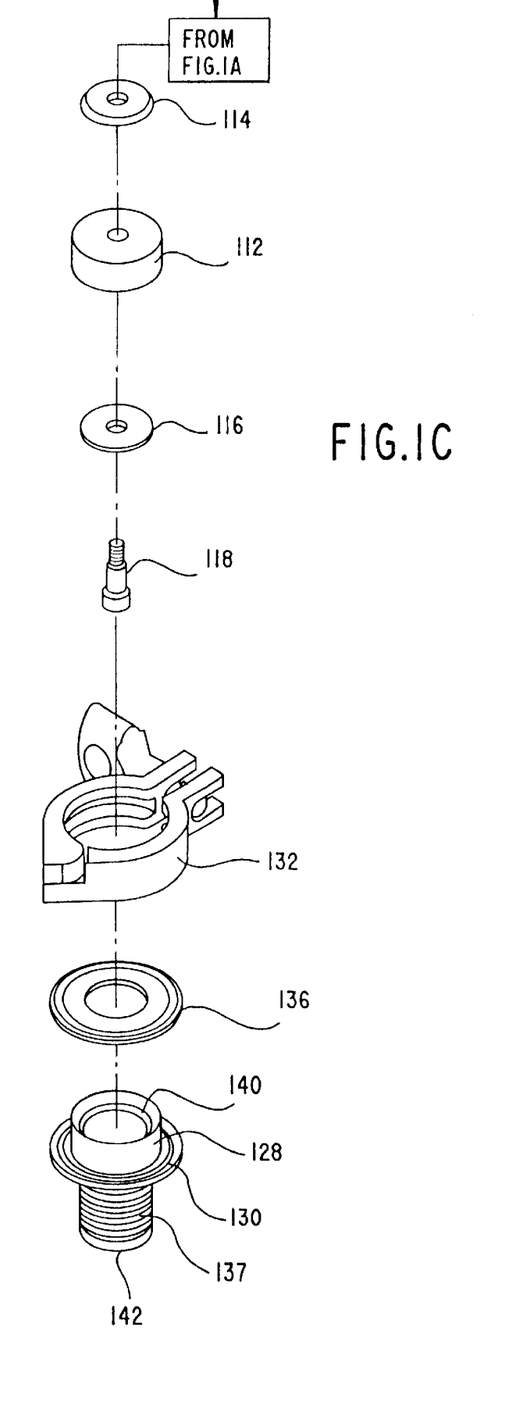
Figure 2:
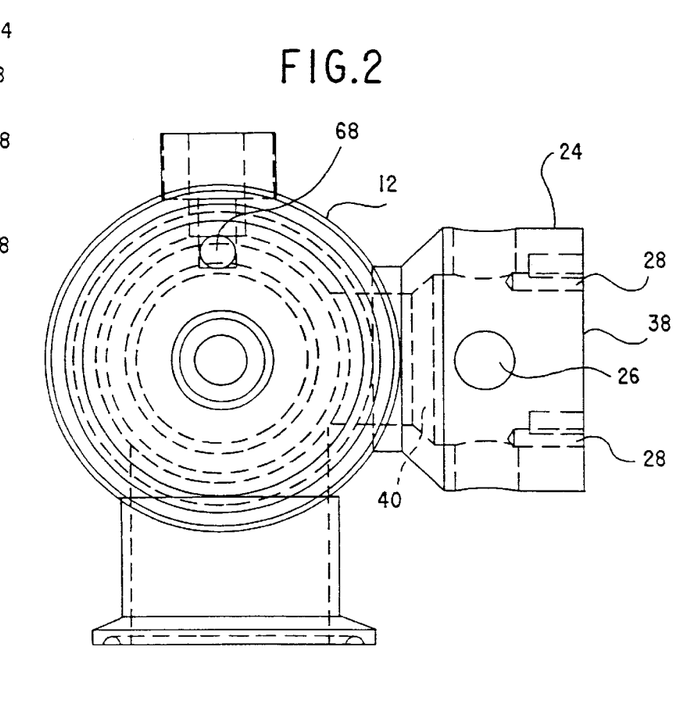
FIG. 2 is a top plan view of the novel evacuation valve housing with the internal parts removed.
Figure 3:
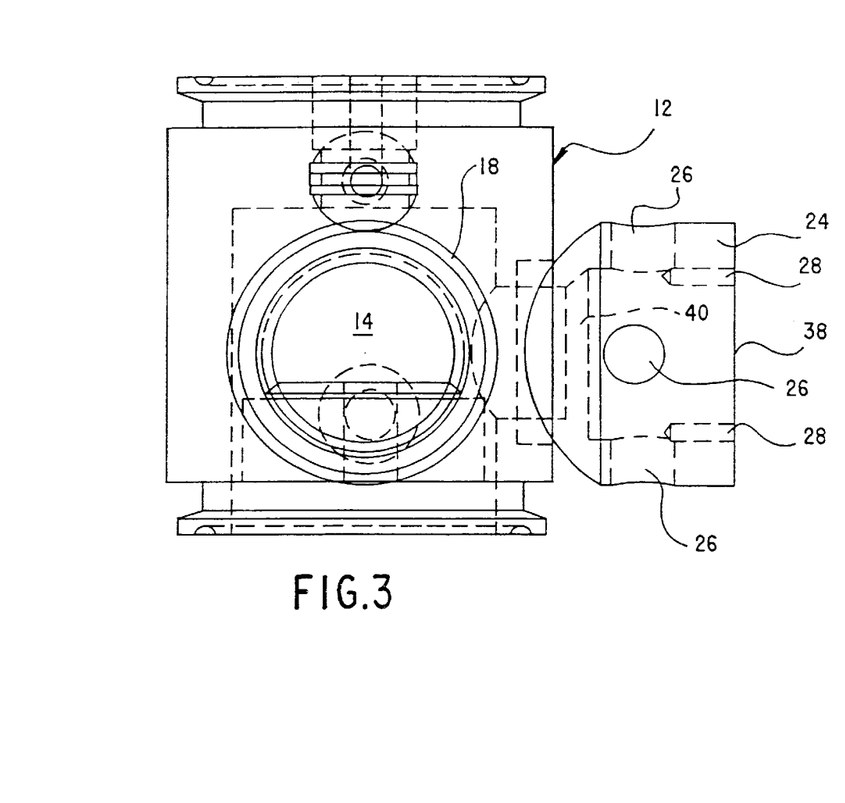
FIG. 3 is a front elevational view of the novel evacuation valve housing of FIG. 2.

A gasket seal 136 is designed to provide an air-tight seal between vacuum valve fitting 128 and vacuum valve fitting flange 134. Vacuum valve fitting 128 includes barbed grooves 137 for accommodating a vacuum hose inlet. Vacuum valve fitting 130 includes an inwardly tapering sealing seat 140 for receiving cylindrical sealing head 112 to positively seal the vacuum source port 142 from housing 12 by the activation of vacuum valve piston 72. Vacuum valve piston 72 is positively controlled by fluid and preferably pneumatic air pressure introduced into pneumatic fitting 70, which transports the air pressure through port 68 to lower cylindrical cup 92, which forms a seal between the cylinder cup 92 and the inner wall of cylindrical housing 76, thereby forcing the retraction of vacuum valve piston 72 from inwardly,tapering sealing seat 140 to admit vacuum into housing.12 and into evacuation port 14.

After evacuation and sealing vacuum valve piston 72 is advanced to close vacuum source port 142 by introducing air pressure into cylinder housing 76 through fitting 144 to provide positive air pressure upon upper cylinder cup 90 to force vacuum valve piston 72 and cylindrical sealing head 112 down into inwardly.tapering sealing seat 140 of vacuum valve fitting 130 to positively control the admission of vacuum into housing 12 and out through vacuum evacuation port 14. Once vacuum source port 142 is closed, vent piston 36 is retracted by admitting air pressure through fitting 62 to remove cylindrical sealing head 42 from inwardly tapering sealing seat 40 to rapidly release vacuum pressure from evacuation port 14 and housing 12 through vent openings 26.

Referring now to FIG. 1 and FIG. 4, an optional sterilization or gassing port 146, which provides the gas inlet port to the packaging machine chamber (FIG. 17) and can be provided in housing 12 to introduce special gases to packaged products through evacuation port 14. Port 146, in housing 12, includes a fitting 148 that is connected to a fluid reservoir for introducing a special processing gas used to prolong the freshness or enhance the flavors of food products through modified atmosphere packaging techniques as are known to those skilled in the art. These processing gasses are introduced into housing 12 and through evacuation port 14 into a package in a packaging machine attached to evacuation port 14. In such applications of the invention, an optional fluid, such as nitrogen, may be introduced through port 146 and through evacuation port 14 into the packaged product to provide gassing, sterilization or other in situ processing in the packaged product. Thereafter, vacuum valve piston 72 can be opened to remove excess gas, such as nitrogen, from the packaged product and the product is then sealed. Vacuum valve piston 72 is then closed to close the vacuum inlet and vent piston 36 is opened to release the vacuum from housing 12 and evacuation port 14 to allow the sealed product to be removed from the processing and packaging machine.

Figure 8:
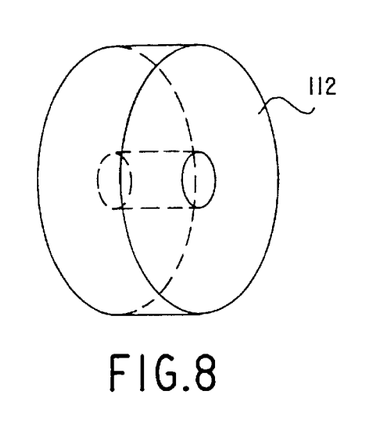
FIG. 8 is a perspective view illustrating the piston sealing heads utilized in combination with the tapered seats in the novel evacuation valve.
Figure 9:
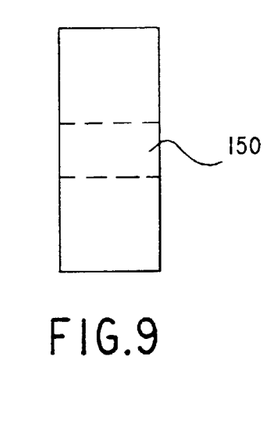
FIG. 9 is a side view of FIG. 8.

Referring now to FIG. 8 and FIG. 9, the preferred configuration of the cylindrical sealing head 42 and 112 is illustrated, which, for the purposes of illustration will be described with respect to cylindrical sealing head 112. Cylindrical sealing head 112 is of a cylindrical cross-sectional configuration having an opening 150 for receiving and connecting bolt 118 to vacuum valve piston 72. In the preferred embodiment of the invention, the cylindrical sealing head is not tapered and is designed to mate with the inwardly tapering sealing seat 140 in the vacuum fitting 128 and inwardly tapering sealing seat 40 of housing 12. Substantially cylindrical sealing head 112 is preferably composed of rubber or an elastomeric material that in combination with the smooth inwardly tapering metal wall of sealing seat 40 or 140 provides an airtight seal.

Figure 10:
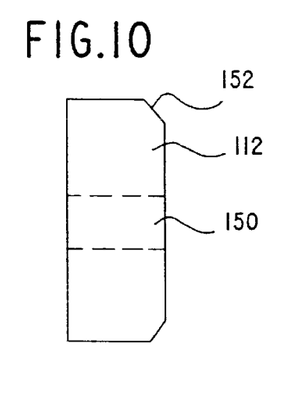
FIG. 10 is a side view of an alternative embodiment of the sealing head illustrating a tape red sealing head.
Figure 11:
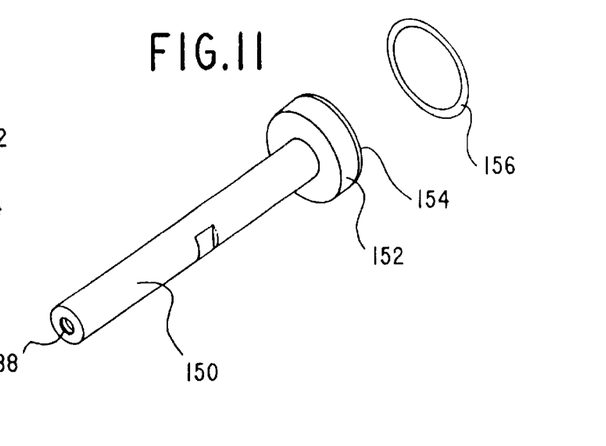
FIG. 11 is a perspective view of an alternative embodiment of a sealing piston head.

In an alternative embodiment of the invention, a modified cylindrical seal 112, can include tapered edges 152 for conforming to the inwardly tapering walls of the sealing seat 140 to assist in reducing wear on the cylindrical seal as illustrated in FIG. 10. In a further embodiment of the invention as illustrated in FIG. 11, a modified piston 150 is illustrated having a metal head 152 with a groove 154 for receiving a rubber or elastomeric O-ring 156 for providing a seal in inwardly tapering sealing seat 40 or 140.

Figure 12:
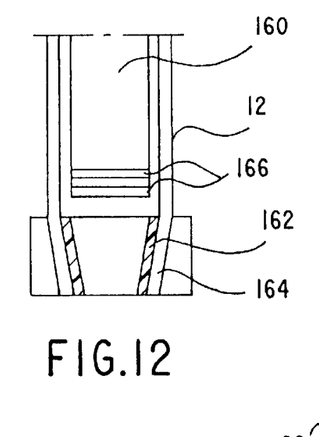
FIG. 12 is an elevational view of a further embodiment of a sealing piston head and tapered seat combination.

Referring now to FIG. 12, an alternative embodiment of a piston and sealing seat is illustrated, wherein a modified. vacuum valve piston or vent piston 160, in housing 12 is designed to close upon an inwardly tapering rubber seal 162 and press the rubber seal against the inwardly tapering walls 164 in modified housing 12. Piston 160 may include one or more O-ring seals 166 disposed around the end of the piston to assist in the sealing operation.

Figure 13:
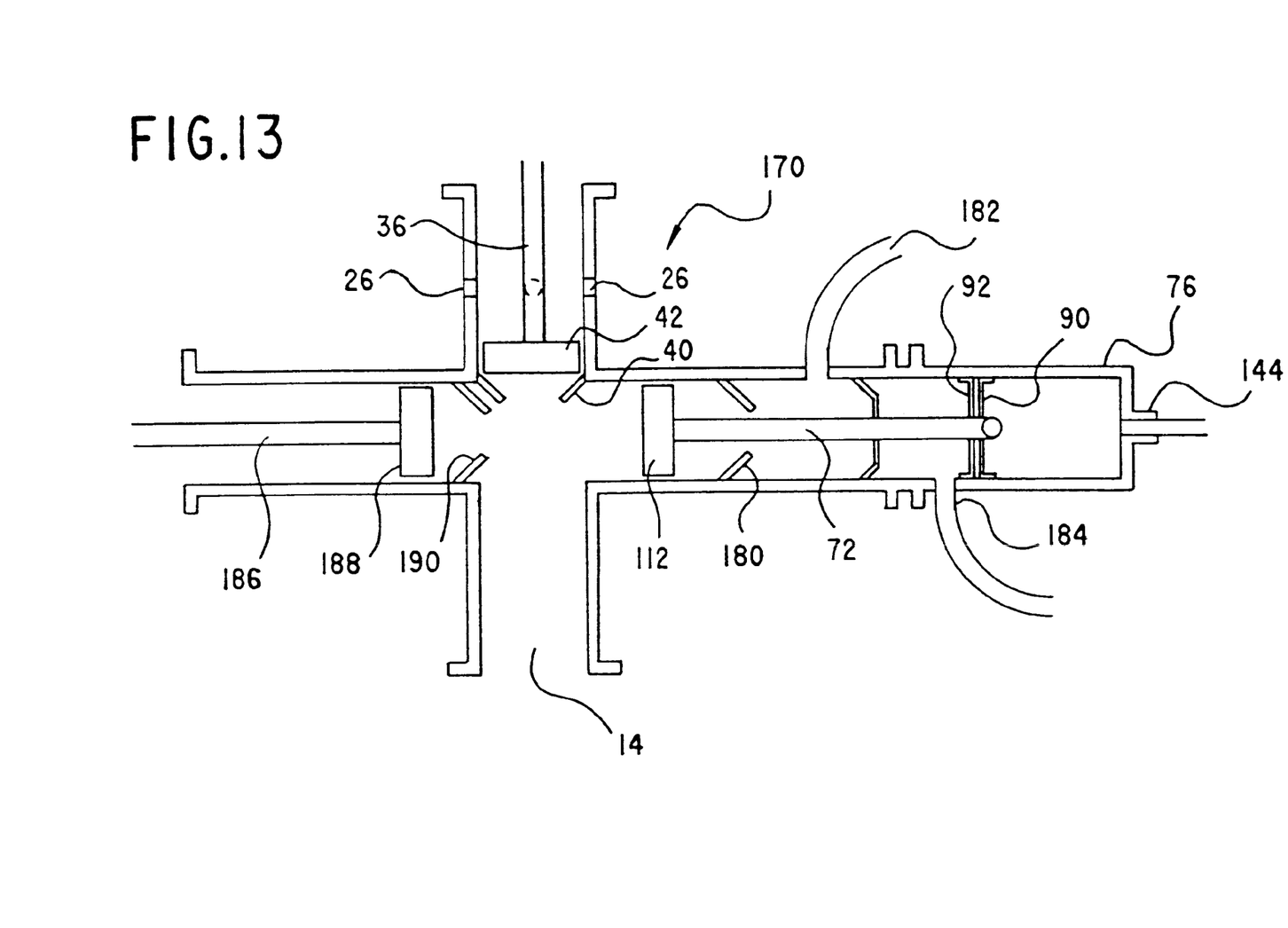
FIG. 13 is a schematic view of a further embodiment of the novel evacuation valve utilizing an optional pneumatically activated gassing piston.

Referring now to FIG. 13 a modified evacuation valve constructed in accordance with an alternative embodiment of the invention is illustrated. The evacuation valve 170 includes a housing 12 having vent openings 26, a vent piston 36 with a sealing head 42 for mating with an inwardly tapering sealing seat 40. A single evacuation port 14 serves to provide evacuation gassing and pressure release to a packaging machine. A cylinder housing 76 is provided for activating a vacuum valve piston 72 having a sealing head 112. Sealing head 112 is designed to seat in tapered seat 180 to close modified vacuum port 182 which provides vacuum to evacuation port 14 through housing 12. Vacuum valve piston 72 is activated in cylinder housing 76 by air pressure through fitting 144 on cup 90 to open the evacuation valve and air pressure through port 184 to provide pressure on cup 92 to close the evacuation valve.

An optional positively controlled gas piston 186 having a sealing head 188 is designed to fit in tapered seat 190 to open and close the admission of an optional gas such as nitrogen into housing 12 and out evacuation port 114. Optional positively controlled gas piston 186 includes an air cylinder 76 for activating piston 186 in a manner as similarly described with respect to vacuum piston 72. Flanges 192 are provided at each of the ports to assist in mounting and interconnecting all the components to provide an easily cleanable evacuation valve.

Figure 14:
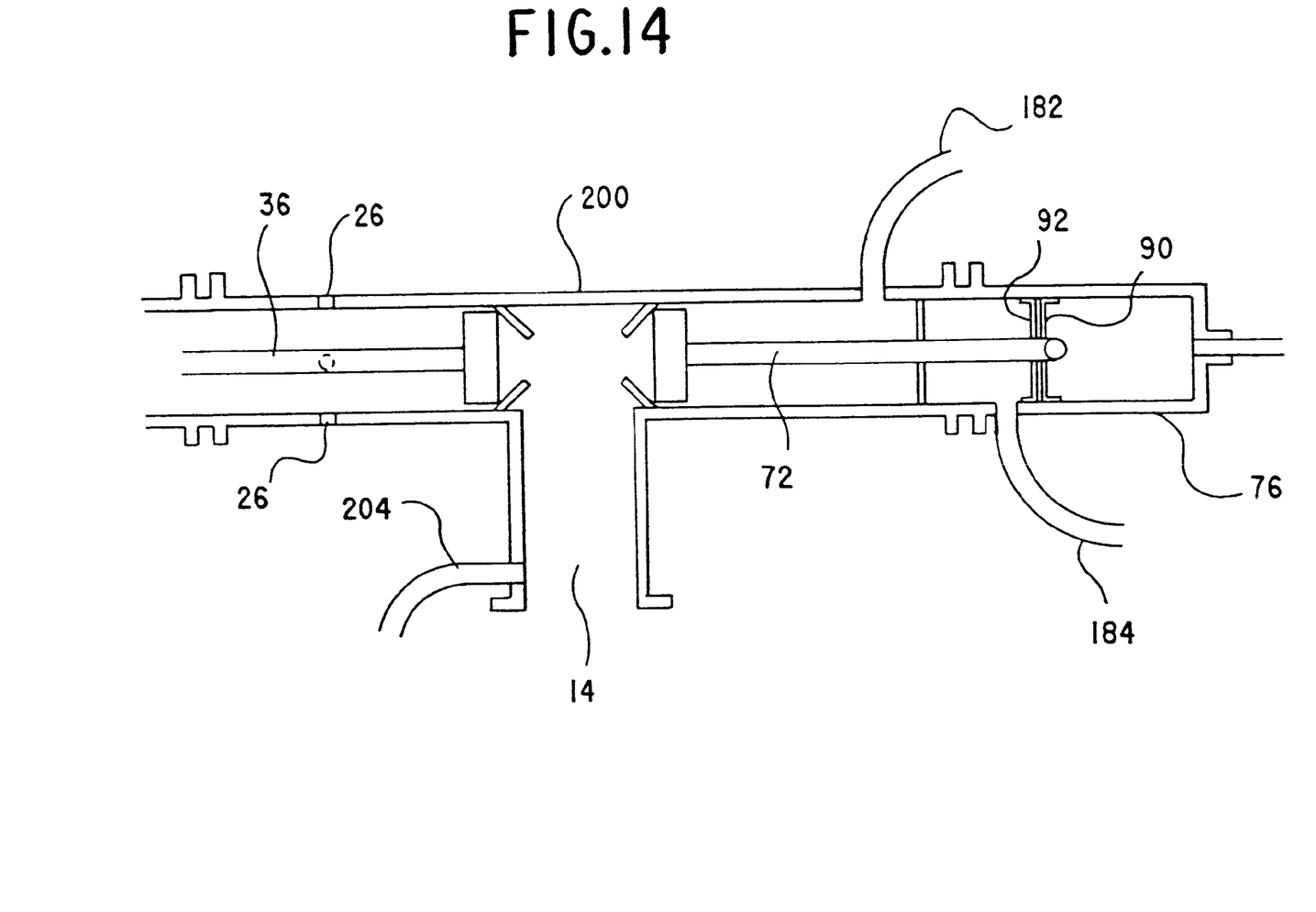
FIG. 14 is a schematic view of an alternative embodiment of the novel evacuation valve.

Referring now to FIG. 14 a further embodiment is illustrated having a modified housing 200, a vacuum valve piston 72, a modified vacuum port 182 and an air cylinder 76 with air cylinder cups 90 and 92 for the activation of vacuum valve piston 72. A vent piston 36 along with vent holes are disposed in housing 200 to provide venting to housing 200 and evacuation port 14 in a manner similarly described with respect to FIG. 13. An optional gassing port 204 is provided to supply a purge gas to a package as previously described with respect to FIG. 1.

Figure 15:
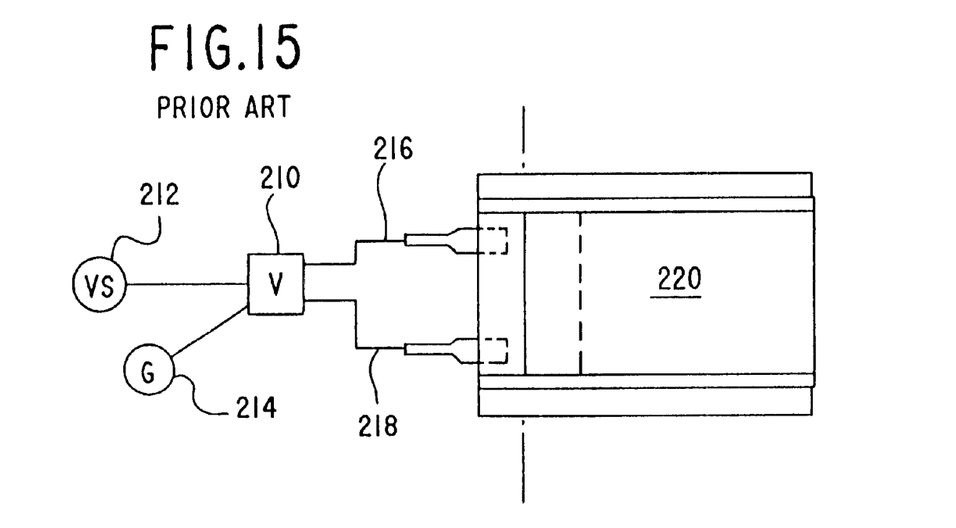
FIG. 15 is a schematic view of a prior art package and evacuation system.

As discussed, the novel evacuation valve of the invention is of a compact configuration, provides positive control over fluids, is easily cleaned and can be placed in situ on a packaging machine. The prior art (FIG. 15) generally employs a remotely located valve 210, a vacuum source 212 and a modified atmosphere gas 214. The vacuum valve 210 generally controls a separate vacuum line 216 and a separate modified atmosphere gas line requiring at least two lines to package 220. The invention in contrast (FIG. 16) employs a novel evacuation valve having a single special gassing, vent and evacuation port 14 to supply all the necessary gases to package 220.

Figure 17:
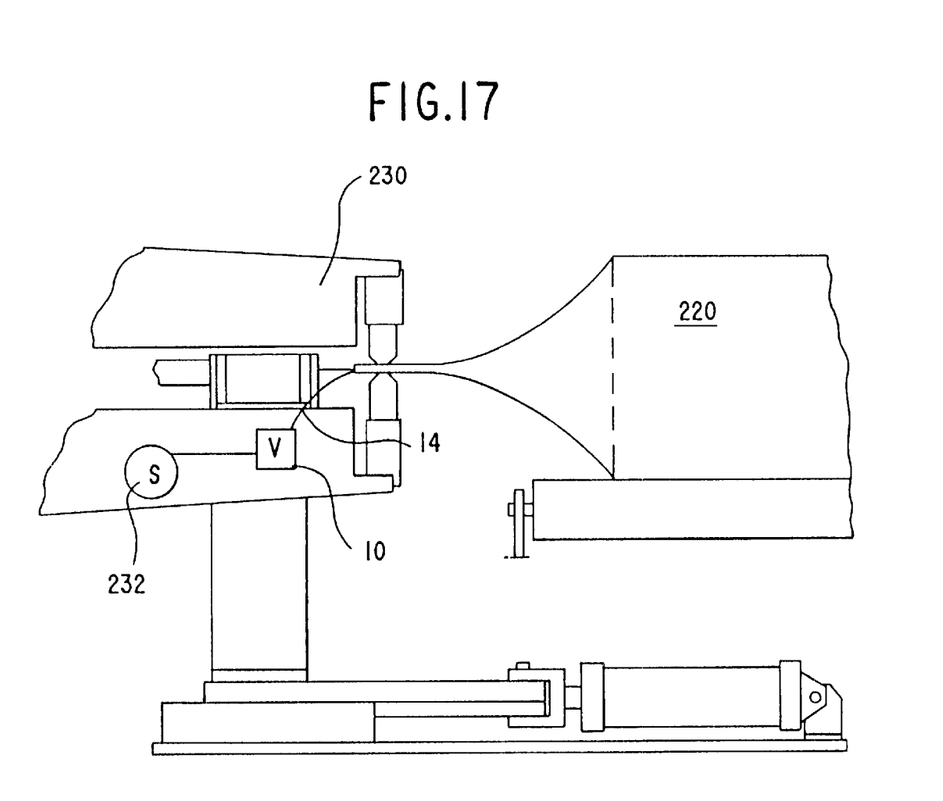
FIG. 17 is a side elevational view illustrating an application of the novel evacuation valve in situ on a packaging machine.

In further contrast to the prior art the novel evacuation valve 10 can be located in situ on a packaging machine 230 as illustrated in FIG. 17. The novel evacuation valve 10 is operated by a solenoid 232 to not only evacuate package 220, but also supply modified atmosphere gas and provide for the rapid release of vacuum through the single evacuation port 14 as heretofore described.

The novel evacuation valve in operation provides positive control over both the opening and closing of the vacuum source as well as the opening and closing of the venting port to the evacuation port. The compact nature of the novel evacuation valve allows is to be placed directly upon food packaging machinery and provides for the efficient and rapid evacuation and rapid removal of vacuum in product processing machinery by the positive control over a first piston disposed between the housing and a vacuum source and a second piston disposed between the housing and the vacuum outlet.

The positive control over both the first and second pistons allows for the evacuation and quick removal of vacuum pressure from various packaging and processing operations as are used in the medical, pharmaceutical and food processing industries. The novel valve further is preferably is made of stainless steel or other material that can be quickly and easily disassembled and cleaned for sanitary and hygienic processing operations.

As will be recognized by those skilled in the art, the invention has a wide range of applicability to various types of processing and packaging machines, where vacuum packaging of products is employed. In addition, optional in situ processing operations can be accomplished by the provision of optional sterilization and processing ports in the novel evacuation valve. Further, those skilled in the art can make numerous changes and substitutions to the invention by modifying the pistons and sealing heads to accommodate specific applications. These changes and modifications are deemed within the level of those of ordinary skill and are included within the scope of the following claims.

As used herein and in the following claims, the word 'comprising' or 'comprises' is used in its American technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated that these and other modifications can be made within the scope of the invention as defined in the following claims.

What is claimed is:

1. A food product machine positive control valve comprising:
    (a) a disassemblable food product valve housing having a detachable first piston chamber, a detachable second piston chamber, a vacuum inlet, a combination evacuating and venting outlet and a vent port;
    (b) a common evacuation and venting chamber connected by a first passage to said vacuum inlet and a second passage connected to said combination evacuating and venting outlet;
    (c) a first piston disposed in said detachable first piston chamber, said first piston having a substantially cylindrical elastomeric sealing end disposed intermediate said vacuum inlet and a tapered portion of said first passage disposed on said first passage on a side of said first passage opposite to said common evacuation and venting chamber;
    (d) a second piston disposed in said detachable second piston chamber, said second piston having a substantially cylindrical elastomeric sealing end disposed intermediate said second piston chamber and a tapered portion of said second passage disposed on a side of said second passage opposite to said common evacuation and venting chamber;
    (e) pneumatic means for activating said first piston to open and close said tapered portion of said first passage between said vacuum inlet and said common evacuation and venting chamber to positively control the position of said first piston both in an open position and in a closed position with air pressure; and
    (f) pneumatic means for activating said second piston to open and close said tapered portion of said second passage between said vent port and said common evacuation and venting chamber.

2. The food product machine positive control valve of claim 1 wherein said tapered portion of said first passage is of a frustro conical configuration.

3. The food product machine positive control valve of claim 1 wherein said vent port is detachable with said second piston.

4. The food product machine positive control valve of claim 3 wherein said vent port is connected to said disassemblable food product valve housing by a flange clamp.

5. The food product machine positive control valve of claim 1 wherein said vacuum inlet is detachable with said first piston.

6. The food product machine positive control valve of claim 1 wherein said vacuum inlet is connected to said disassemblable food product valve housing by a flange clamp.

7. The food product machine positive control valve of claim 1 further comprising a gas port in said disassemblable food product valve housing.

8. The food product machine positive control valve of claim 1 wherein said common evacuation and venting chamber includes a third passage.

9. The food product machine positive control valve of claim 8 further comprising a detachable gas port housing including a third piston and cylinder combination for opening and closing said third passage.

10. A machine positive control valve comprising:
   (a) a disassemblable valve housing having a detachable first piston chamber, a detachable second piston chamber, a vacuum inlet, a combination evacuating and venting outlet and a vent port;
   (b) a common evacuation and venting chamber connected by a first passage to said vacuum inlet and a second passage connected to said combination evacuating and venting outlet;
   (c) a first piston disposed in said detachable first piston chamber, said first piston having a cylindrical elastomeric sealing end disposed intermediate said vacuum inlet and a tapered portion of said first passage disposed on said first passage on a side of said first passage opposite to said common evacuation and venting chamber;
   (d) a second piston disposed in said detachable second piston chamber, said second piston having a cylindrical elastomeric sealing end disposed intermediate said second piston chamber and a tapered portion of said second passage disposed on a side of said second passage opposite to said common evacuation and venting chamber;
   (e) pneumatic means for activating said first piston to open and close said tapered portion of said first passage between said vacuum inlet and said common evacuation and venting chamber to positively control the position of said first piston both in an open position and in a closed position with air pressure; and
   (f) pneumatic means for activating said second piston to open and close said tapered portion of said second passage between said vent port and said common evacuation and venting chamber.

11. The machine positive control valve of claim 10 wherein said tapered portion of said first passage is of a frustro conical configuration.

12. The machine positive control valve of claim 10 wherein said vent port is detachable with said second piston.

13. The machine positive control valve of claim 12 wherein said vent port is connected to said disassemblable valve housing by a flange clamp.

14. The machine positive control valve of claim 10 wherein said vacuum inlet is detachable with said first piston.

15. The machine positive control valve of claim 10 wherein said vacuum inlet is connected to said disassemblable valve housing by a flange clamp.

16. The machine positive control valve of claim 10 further comprising a gas port in said disassemblable valve housing.

17. The machine positive control valve of claim 10 wherein said common evacuation and venting chamber includes a third passage.

18. The machine positive control valve of claim 17 further comprising a detachable gas port housing including a third piston and cylinder combination for opening and closing said third passage.

19. The machine positive control valve of claim 18 wherein said third passage is tapered.

20. A positive control valve comprising:
   (a) a disassemblable valve housing having a detachable first piston chamber, a detachable second piston chamber, a vacuum inlet, a combination evacuating and venting outlet and a vent port;
   (b) a common evacuation and venting chamber connected by a first passage to said vacuum inlet and a second passage connected to said combination evacuating and venting outlet;
   (c) a first piston disposed in said detachable first piston chamber, said first piston having a metal piston head with an O-ring seal disposed intermediate said vacuum inlet and a tapered portion of said first passage disposed on said first passage on a side of said first passage opposite to said common evacuation and venting chamber;
   (d) a second piston disposed in said detachable second piston chamber, said second piston having a metal piston head with an O-ring seal disposed intermediate said second piston chamber and a tapered portion of said second passage disposed on a side of said second passage opposite to said common evacuation and venting chamber;
   (e) pneumatic means for activating said first piston to open and close said tapered portion of said first passage between said vacuum inlet and said common evacuation and venting chamber to positively control the position of said first piston both in an open position and in a closed position with air pressure; and
   (f) pneumatic means for activating said second piston to open and close said tapered portion of said second passage between said vent port and said common evacuation and venting chamber.

21. The positive control valve of claim 20 wherein said tapered portion of said first passage is of a frustro conical configuration.

22. The positive control valve of claim 20 wherein said vent port is detachable with said second piston.

23. The positive control valve of claim 22 wherein said vent port is connected to said disassemblable valve housing by a flange clamp.

24. The positive control valve of claim 20 wherein said vacuum inlet is detachable with said first piston.

25. The positive control valve of claim 20 wherein said vacuum inlet is connected to said disassemblable valve housing by a flange clamp.

26. The positive control valve of claim 20 further comprising a gas port in said disassemblable valve housing.

27. The positive control valve of claim 20 wherein said common evacuation and venting chamber includes a third passage.

28. The positive control valve of claim 27 further comprising a detachable gas port housing including a third piston and cylinder combination for opening and closing said third passage.

29. A vacuum valve comprising:
(a) a housing having a vacuum inlet port, a combination gassing, venting and evacuation product outlet port a gassing port and a vent port and a common internal chamber disposed intermediate thereto;
(b) a detachable first piston housing having a first piston having a substantially cylindrical elastomeric sealing means for opening and closing a first tapered passage connecting said common internal chamber to said vacuum inlet port, said first piston disposed intermediate said vacuum inlet port and said first tapered passage;
(c) a detachable second piston housing having a second piston having a substantially cylindrical elastomeric sealing means for opening and closing a second tapered passage connecting said common internal chamber to said vent port, said second piston disposed intermediate said vent port and said second tapered passage;
(d) a detachable third piston housing having a third piston having a substantially cylindrical sealing means for opening and closing a third tapered passage connecting said common internal chamber to said gassing port, said third piston disposed intermediate said gassing port and said third tapered passage; and
(e) means for operating said first piston, said second piston and said third piston.

30. The vacuum valve of claim 29 wherein said first tapered passage, said second tapered passage and said third tapered passage are of a frustro conical configuration.

31. The vacuum valve of claim 29 wherein said detachable first piston housing is connected to said housing by a flange clamp.

32. The vacuum valve of claim 29 wherein said detachable second piston housing is connected to said housing by a flange clamp.

33. The vacuum valve of claim 29 wherein said detachable third piston housing is connected to said housing by a flange clamp.

34. The vacuum valve of claim 29 wherein said means for operating is pneumatic.

35. The vacuum valve of claim 29 wherein said means for operating is electrical.

36. A vacuum valve comprising:
(a) a housing having a vacuum inlet port, a combination gassing, venting and evacuation product outlet port a gassing port and a vent port and a common internal chamber disposed intermediate thereto;
(b) a detachable first piston housing having a first piston having a cylindrical elastomeric sealing means for opening and closing a first tapered passage connecting said common internal chamber to said vacuum inlet port, said first piston disposed intermediate said vacuum inlet port and said first tapered passage;
(c) a detachable second piston housing having a second piston having a cylindrical elastomeric sealing means for opening and closing a second tapered passage connecting said common internal chamber to said vent port, said second piston disposed intermediate said vent port and said second tapered passage;
(d) a detachable third piston housing having a third piston having a cylindrical sealing means for opening and closing a third tapered passage connecting said common internal chamber to said gassing port, said third piston disposed intermediate said gassing port and said third tapered passage; and
(e) means for operating said first piston, said second piston and said third piston.

37. The vacuum valve of claim 36 wherein said vent port includes a plurality of openings.

38. The vacuum valve of claim 36 wherein said detachable first piston housing is connected to said housing by a flange clamp.

39. The vacuum valve of claim 36 wherein said detachable second piston housing is connected to said housing by a flange clamp.

40. The vacuum of claim 36 wherein said detachable third piston housing is connected to said housing by a flange clamp.

41. The vacuum valve of claim 36 wherein said means for operating is pneumatic.

42. The vacuum valve of claim 36 wherein said means for operating is electrical.

43. A vacuum valve comprising:
(a) a housing having a vacuum inlet port, a combination gassing, venting and evacuation product outlet port a gassing port and a vent port and a common internal chamber disposed intermediate thereto;
(b) a detachable first piston housing having a first piston having a metal piston head with an O-ring seal for opening and closing a first tapered passage connecting said common internal chamber to said vacuum inlet port, said first piston disposed intermediate said vacuum inlet port and said first tapered passage;
(c) a detachable second piston housing having a second piston having a metal piston head with an O-ring seal for opening and closing a second tapered passage connecting said common internal chamber to said vent port, said second piston disposed intermediate said vent port and said second tapered passage;
(d) a detachable third piston housing having a third piston having a metal piston head with an O-ring seal for opening and closing a third tapered passage connecting said common internal chamber to said gassing port, said third piston disposed intermediate said gassing port and said third tapered passage; and
(e) means for operating said first piston, said second piston and said third piston.

44. The vacuum valve of claim 43 wherein said vent port includes a plurality of openings.

45. The vacuum valve of claim 43 wherein said detachable first piston housing is connected to said housing by a flange clamp.

46. The vacuum valve of claim 43 wherein said detachable second piston housing is connected to said housing by a flange clamp.

47. The vacuum of claim 43 wherein said detachable third piston housing is connected to said housing by a flange clamp.

48. The vacuum valve of claim 43 wherein said means for operating is pneumatic.

49. The vacuum valve of claim 43 wherein said first tapered passage, said second tapered passage and said third tapered passage are of a frustro conical configuration.

* * * * *